(12) United States Patent
Magnusson et al.

(10) Patent No.: US 10,874,060 B2
(45) Date of Patent: Dec. 29, 2020

(54) SYSTEMS AND METHODS FOR IRRIGATING ACCORDING TO A MODIFIED OR RESET CROP GROWTH MODEL

(71) Applicant: LINDSAY CORPORATION, Omaha, NE (US)

(72) Inventors: Brian James Magnusson, Clarendon Hills, IL (US); Kurtis Arlan Charling, Elkhorn, NE (US)

(73) Assignee: Lindsay Corporation, Omaha, NE (US)

( * ) Notice: Subject to any disclaimer, the term of this patent is extended or adjusted under 35 U.S.C. 154(b) by 0 days.

(21) Appl. No.: 16/293,179

(22) Filed: Mar. 5, 2019

(65) Prior Publication Data

US 2019/0281776 A1  Sep. 19, 2019

Related U.S. Application Data

(60) Provisional application No. 62/642,713, filed on Mar. 14, 2018.

(51) Int. Cl.
*A01G 25/16* (2006.01)
*A01G 25/09* (2006.01)
*G06K 9/00* (2006.01)

(52) U.S. Cl.
CPC .......... *A01G 25/16* (2013.01); *A01G 25/092* (2013.01); *G06K 9/00657* (2013.01)

(58) Field of Classification Search
None
See application file for complete search history.

(56) References Cited

U.S. PATENT DOCUMENTS

| | | | | |
|---|---|---|---|---|
| 5,927,603 A | * | 7/1999 | McNabb | A01G 25/092 239/63 |
| 8,565,927 B1 | * | 10/2013 | Campbell | A01G 25/167 111/118 |
| 2015/0027043 A1 | * | 1/2015 | Redden | A01G 22/00 47/58.1 R |

* cited by examiner

*Primary Examiner* — Mohammad Ali
*Assistant Examiner* — Saad M Kabir
(74) *Attorney, Agent, or Firm* — Hovey Williams LLP

(57) ABSTRACT

An irrigation system includes a plurality of mobile support towers driven my motors; a fluid-carrying conduit supported by the mobile towers; a number of water-emitters connected to the conduit; one or more valves which can be opened or closed to control fluid flow through the water emitters; and a control system. The control system controls the speed of the mobile towers and the flow of water through the water emitters in accordance with one or more irrigation scheduling plans. The control system also receives crop growth data from one or more sensors and aerial image data from one or more remote imaging systems and detects significant crop events from the data and improves irrigation scheduling in response to such detections.

12 Claims, 14 Drawing Sheets

Kc vs fCover for soybeans

| | |
|---|---|
| Expected Maturity | 9/28/2017 |
| Crop Growth Stage | V11 |
| Crop Coefficient, $K_c$ | 0.89 |
| Rooting Depth (meters) | 0.88 |
| Critical Depletion Factor | 0.50 |
| Total Available Water (TAW) (mm) | 167.15 |
| Readily Available Water (RAW) (mm) | 83.58 |
| Potential Yield Loss To Date | 1.80% |
| Forecasted Potential Yield Loss (No Additional Irrigation) | 29.60% |
| Soil Water Depletion (mm) | 91.68 |

No adjustments crop growth and soil water depletion data for 7/1/2017.

Fig. 6.

No adjustments crop growth and soil water depletion graph.

| | |
|---|---|
| Expected Maturity | 10/8/2017 |
| Crop Growth Stage | V9 |
| Crop Coefficient, $K_c$ | 0.68 |
| Rooting Depth (meters) | 0.79 |
| Critical Depletion Factor | 0.50 |
| Total Available Water (TAW) (mm) | 150.32 |
| Readily Available Water (RAW) (mm) | 75.16 |
| Potential Yield Loss To Date | 0.10% |
| Forecasted Potential Yield Loss (No Additional Irrigation) | 25.60% |
| Soil Water Depletion (mm) | 74.97 |

Crop growth and soil water depletion data for 7/1/2017 based on adjusted crop growth and irrigation schedule model.

*Fig. 8.*

Crop growth and soil water depletion graph based on adjusted crop growth and irrigation schedule model.

| | |
|---|---|
| Expected Maturity | 9/28/2017 |
| Crop Growth Stage | V18 |
| Crop Coefficient, $K_c$ | 1.20 |
| Rooting Depth (meters) | 1.00 |
| Critical Depletion Factor | 0.50 |
| Total Available Water (TAW) (mm) | 190.83 |
| Readily Available Water (RAW) (mm) | 95.42 |
| Potential Yield Loss To Date | 3.10% |
| Forecasted Potential Yield Loss (No Additional Irrigation) | 12.50% |
| Soil Water Depletion (mm) | 84.13 |

No adjustments crop growth and soil water depletion data for 7/18/2017.

*Fig. 10.*

No adjustments crop growth and soil water depletion graph.

| | |
|---|---|
| Expected Maturity | 10/28/2017 |
| Crop Growth Stage | V11 |
| Crop Coefficient, $K_c$ | 0.82 |
| Rooting Depth (meters) | 1.00 |
| Critical Depletion Factor | 0.50 |
| Total Available Water (TAW) (mm) | 190.83 |
| Readily Available Water (RAW) (mm) | 95.42 |
| Potential Yield Loss To Date | 3.10% |
| Forecasted Potential Yield Loss (No Additional Irrigation) | 16.1% |
| Soil Water Depletion (mm) | 89.13 |

Crop growth and soil water depletion data for 7/18/2017 based on reset crop growth and irrigation schedule model.

*Fig. 12.*

Crop growth and soil water depletion graph based on reset crop growth and irrigation schedule model.

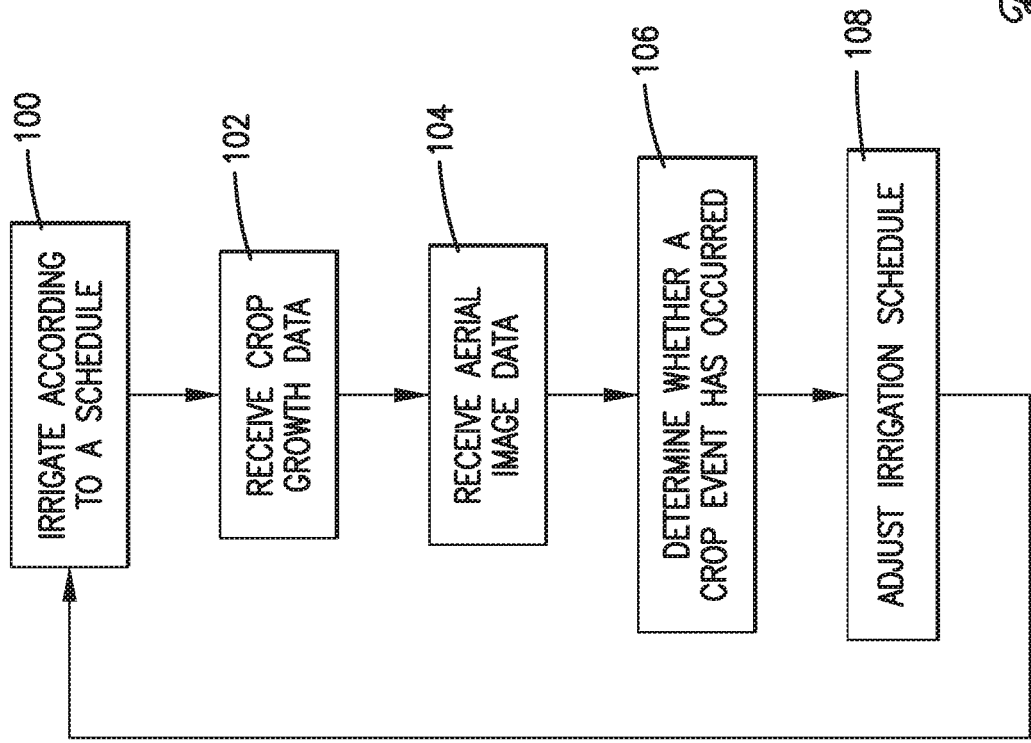

SYSTEMS AND METHODS FOR IRRIGATING ACCORDING TO A MODIFIED OR RESET CROP GROWTH MODEL

RELATED APPLICATION

The present application is a non-provisional patent application and claims priority benefit, with regard to all common subject matter, of earlier-filed U.S. provisional patent application titled "SYSTEM AND METHOD FOR IRRIGATING ACCORDING TO A MODIFIED OR RESET CROP GROWTH MODEL", Ser. No. 62/642,713, filed on Mar. 14, 2018, incorporated by reference in its entirety into the present application.

BACKGROUND OF THE INVENTION

1. Field of the Invention

The present invention relates to agricultural irrigation systems. More particularly, the invention relates to systems and methods for irrigating according to a modified or reset crop growth model.

2. Background

Agricultural irrigation systems such as center pivot and lateral move irrigation systems are commonly used to irrigate crops. It is desirable to monitor and control the amount of water delivered by an irrigation system to prevent over or under-watering and to conserve water. Thus, modern irrigation systems typically include control systems that receive and implement irrigation schedules to control the speed of their drive motors and/or the opening and closing of their water valves to deliver prescribed amounts of water to crops.

Crop growth and development plays a critical role in proper irrigation scheduling. That is, irrigation should be a function of the maturity and health of a crop. For example, mature crops generally require more water than seedlings, and mature crops that will soon be harvested are typically not irrigated for a period of time before the harvest. To that end, crop modeling is often used to determine observed and forecasted crop growth to assess crop water usage, predict potential crop yield loss due to water stress, and determine critical soil water depletion levels. Such crop modeling is then often used to develop and/or modify irrigation schedules. However, factors that cannot be determined with conventional crop growth modeling, such as pest infestation, disease, hail damage, and abnormal temperatures, can also affect crop growth and development and thus irrigation requirements. As a result, it is often difficult to accurately predict and determine crop growth and irrigation needs when such significant crop events occur.

SUMMARY OF THE INVENTION

Embodiments of the current invention solve the above-mentioned problems and other related problems by providing systems and methods for detecting significant crop events and improving irrigation scheduling in response to such detections.

An irrigation system which may implement principles of the present invention comprises a plurality of mobile support towers driven my motors; a fluid-carrying conduit supported by the mobile towers; a number of sprinklers or other water-emitters connected to the conduit; one or more valves which can be opened or closed to control fluid flow through the water emitters; and a control system.

The control system controls operational aspects of the irrigation system such as the speed of the mobile towers and the flow of water through the water emitters in accordance with one or more irrigation scheduling plans and may be located on or near one of the mobile towers, on or near a center pivot, or remotely from the mobile towers and center pivot. In accordance with important aspects of the invention, the control system also receives crop growth data from one or more sensors and aerial image data from one or more remote imaging systems for detecting significant crop events and improving irrigation scheduling in response to such detections.

The sensors may be positioned on the mobile support towers or in the field and may be any devices configured to sense or otherwise measure factors related to the maturity and/or health of irrigated crops. For example, the sensors may measure the amount of water delivered to the crops, the amount of water in the ground, air temperatures near the crops, humidity near the crops, soil content of the ground in which the crops are planted, and/or other information. The sensors then generate corresponding crop growth data and transmit the data, directly or indirectly, to the control system.

The remote imaging systems may be any devices capable of gathering images of crops such as satellites, unmanned aerial vehicles (UAVs), or cameras mounted on poles or other structures. The remote imaging systems generate aerial image data and transmit the data, directly or indirectly, to the control system.

The control system analyzes the crop growth data from the sensors and the aerial image data from the remote imaging systems and identifies significant crop events based on the data. In one embodiment, the crop data received from the sensors may be augmented according to the aerial image data. The control system then modifies or resets a crop growth model depending on whether a significant crop event has been identified and the nature and/or severity of the identified significant crop event. The control system may also adjust an irrigation scheduling plan so as to irrigate the crops according to the modified or reset crop growth model.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 6 is a data table for crop values for a selected date with no adjustments;

FIG. 8 is a data table for crop values for a selected date based on an adjusted crop growth and irrigation schedule model;

FIG. 10 is a data table for crop values for a selected date with no adjustments;

FIG. 12 is a data table for crop values for a selected date based on a reset crop growth and irrigation schedule model;

FIG. 14 is a flow diagram depicting exemplary steps of a method of the present invention.

Figure 1:
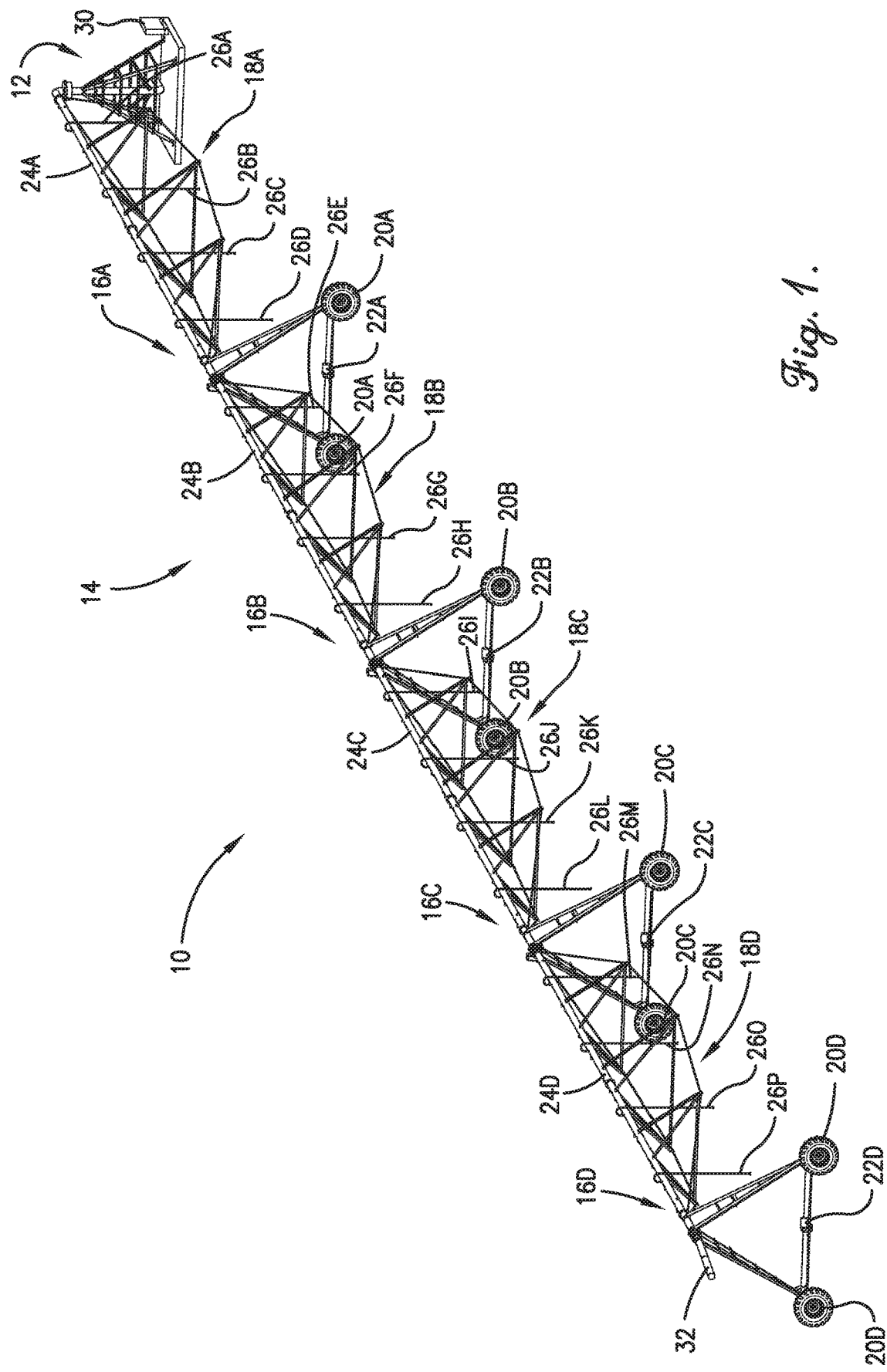
FIG. 1 is a perspective view of an exemplary irrigation system with which principles of the present invention may be implemented.

The drawing figures do not limit the invention to the specific embodiments disclosed and described herein. The drawings are not necessarily to scale, emphasis instead being placed upon clearly illustrating the principles of the invention.

DETAILED DESCRIPTION OF THE EMBODIMENTS

The present invention may be implemented with an irrigation system having a control system. The control system controls operational aspects of the irrigation system such as its speed and/or its water application rate in accordance with one or more irrigation schedules. In accordance with important aspects of the invention, the control system also receives crop growth data from one or more sensors and aerial image data from one or more remote imaging systems for detecting significant crop events and improving irrigation scheduling in response to such detections.

Turning now to the drawing figures, and initially FIG. 1, an exemplary irrigation system 10 which may implement aspects of the present invention is shown. The illustrated irrigation system 10 is a center pivot irrigation system, but it may also be a linear move or lateral type irrigation system or any other type of automated irrigation system. The illustrated irrigation system 10 broadly comprises a fixed center pivot 12 and a main section 14 pivotally connected to the center pivot.

The fixed center pivot 12 may be a tower or any other support structure about which the main section 14 pivots. The center pivot has access to a well, water tank, or other source of water and may also be coupled with a tank or other source of agricultural products to inject fertilizers, pesticides and/or other chemicals into the water for application during irrigation.

The main section 14 pivots or rotates about the center pivot 12 and includes a number of mobile support towers 16A-D, the outermost 16D of which is referred to herein as an end tower. The mobile towers are connected to the fixed center pivot 12 and to one another by truss sections 18A-D or other supports to form a number of interconnected spans. The illustrated irrigation system 10 has four mobile support towers, and thus four spans, however, it may comprise any number of towers and spans without departing from the scope of the invention The mobile towers have wheels 20A-D driven by drive motors 22A-D. Each motor 22A-D turns at least one of the wheels 20A-D through a drive shaft or directly to move its mobile tower and thus the main section 14 in a circle or semi-circle about the center pivot 12. The motors 22A-D may include integral or external relays so they may be turned on, off, and reversed by the control system 30 described below. The motors may also have several speeds or be equipped with variable speed drives.

Although not required, some or all of the towers 16A-D may be equipped with steerable wheels pivoted about upright axes by suitable steering motors so that the towers can follow a predetermined track. As is also well known, the drive motors for the towers are controlled by a suitable safety system such that they may be slowed or completely shut down in the event of the detection of an adverse circumstance.

The mobile towers 16A-D and the truss sections 18A-D carry or otherwise support inter-connected conduit sections 24A-D or other fluid distribution mechanisms that are connected to a source of fluids from the center pivot. A plurality of sprinkler heads, spray guns, drop nozzles, or other water emitters 26A-P are spaced along the conduit sections 24A-D to apply water and/or other fluids to land underneath the irrigation system.

One or more valves 28 may be disposed between the conduit sections 24A-D and the water emitters 26A-P and/or between the conduit sections and the fixed center pivot to control the flow of water through the water emitters. In some embodiments, the irrigation system includes several valves, and each valve controls the flow of water through a single water emitter such that each water emitter can be individually opened, closed, pulsed, etc. to emit any amount of water. In other embodiments, the irrigation system 10 includes several valves that each control the flow of water through a group of water emitters such that the group of water emitters is controlled to emit a specific amount of water. For example, each span of the irrigation system may include four water emitters, and one valve may control the water flow through all four water emitters such that all of the water emitters on a span operate in unison. The valves may be magnetic latching solenoid valves that are normally biased to an off/closed state such that the valves only switch to an on/open state when powered, but they may be any type of valve.

The irrigation system 10 may also include a flow meter that measures water flow rates through the system. Outputs from the flow meter may be provided to the control system described below. In one embodiment, a single flow meter measures flow rates through the entire irrigation system and provides an indication of this aggregate flow rate to the control system. In other embodiments, multiple flow meters provide flow-rate measurements through different portions of the irrigation system, such as through each span of the irrigation system or even each water emitter.

Embodiments of the irrigation system 10 may also include a pressure regulator for regulating the pressure of water through the irrigation system. Pumps that provide water to the irrigation system may be configured to provide a minimum water pressure, and the pressure regulator then reduces the pump water pressure to a selected maximum pressure level such that the pumps and pressure regulator together provide a relatively constant water pressure through the irrigation system.

The irrigation system 10 may also comprise an extension arm (also commonly referred to as a "swing arm" or "corner arm") pivotally connected to the free end of the main section and/or one or more high pressure sprayers or end guns 32 mounted to the end tower 16D or to the end of the extension arm. The end guns are activated at the corners of a field or other designated areas to increase the amount of land that can be irrigated.

The irrigation system 10 may also comprise a location-determining component that detects positions of the irrigation system and generates corresponding position signals. The location-determining component may be a global navigation satellite system (GNSS) receiver such as a GPS receiver, Glonass receiver, Galileo receiver, or compass system receiver operable to receive navigational signals from satellites to calculate positions of the mobile towers as a function of the signals. The GNSS receiver may include one or more processors, controllers, or other computing devices and memory for storing information accessed and/or generated by the processors or other computing devices and may include or be coupled with a patch antenna, helical antenna, or any other type of antenna. The location-determining component may calculate positions of the irrigation system and generate corresponding position signals to be transmitted a control system described below or may simply relay satellite signals to the control system so the control system may calculate the positions of the irrigation system.

The location-determining component may also comprise other type of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

The location-determining component may also be an angle encoder for sensing angles between the center pivot 12 and the main section 14 and/or one or more modified cam switches, proximity switches, optical encoders, potentiometers, light bar sensors, etc. at one of the joints of the irrigation system.

The irrigation system 10 may also include an alignment system for maintaining alignment of the mobile towers 20A-D. The alignment system will not be discussed in depth but may be implemented with hardware, software, firmware, or combinations thereof. The alignment system may also be integrated with the control system described below.

The control system 30 controls operation of the irrigation system 10 and implements aspects of the present invention. The control system can be located anywhere, such as in a panel beside the center pivot 12 as shown in FIG. 1, remotely from the other components of the irrigation system, or both locally and remotely, and can be implemented with hardware, software, firmware, or a combination thereof. One embodiment of the control system 30 may comprise a processing element, controller, or other computing device; conventional input devices such as knobs, buttons, switches, dials, etc.; inputs for receiving programs and data from external devices; one or more displays; and a communications element. The communications element may be a cellular or other radio transceiver for wirelessly receiving and transmitting data from and to remote devices; a short distance wireless data exchange standard (hereinafter "Bluetooth™") transceiver; a WiFi transceiver; and/or other components. The control system may be embodied by a custom application-specific device, a workstation computer, a desktop computer, a laptop computer, a tablet computer, a smart phone, a smart watch, or any other device which comprises a wireless communication element, a memory element and a processing element.

Figure 3:
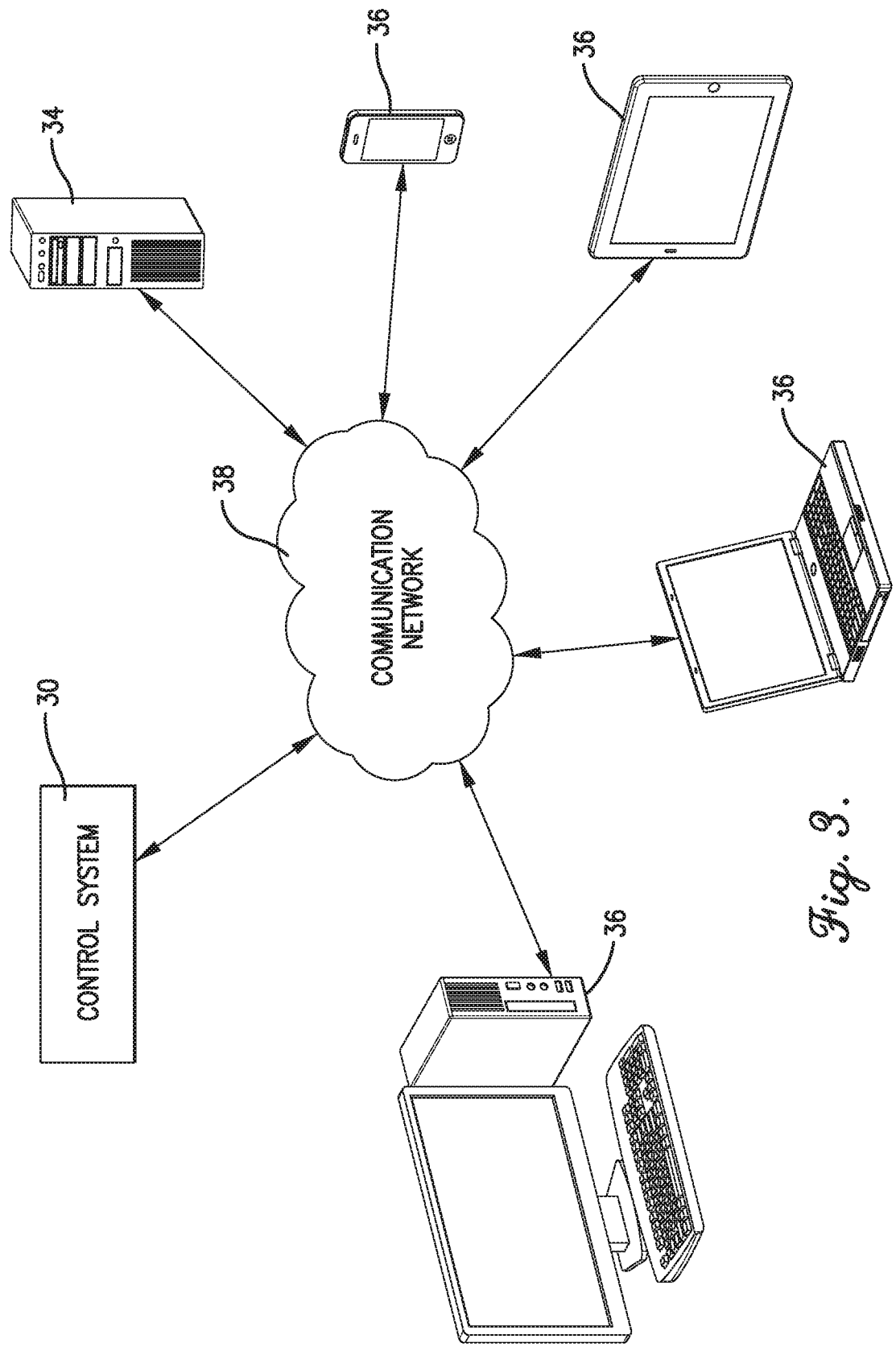
FIG. 3 is a block diagram depicting selected components of computing and communication equipment which may implement aspects of the present invention.

As shown in FIG. 3, the control system 30 may communicate with a data server 34 and personal computing devices 36 or other remote computing systems via a communication network 38. The communication network 38 may include the Internet, cellular communication networks, local area networks, metro area networks, wide area networks, cloud networks, conventional telephone service networks, and the like, or combinations thereof. The communication network 38 may be wired, wireless, or combinations thereof and may include components such as modems, gateways, switches, routers, hubs, access points, repeaters, towers, and the like. The control systems 16 may connect to the communication network 38 either through wires, such as electrical cables or fiber optic cables, or wirelessly, such as RF communication using wireless standards such as cellular 2G, 3G, or 4G, Institute of Electrical and Electronics Engineers (IEEE) 802.11 standards such as WiFi, IEEE 802.16 standards such as WiMAX, short-wavelength UHF radio wave standards such as Bluetooth™, or combinations thereof.

The communication element of the control system may include signal or data transmitting and receiving circuits, such as antennas, amplifiers, filters, mixers, oscillators, digital signal processors (DSPs), and the like. The communication element of the control system may establish communication wirelessly by utilizing RF signals and/or data that comply with communication standards such as cellular 2G, 3G, or 4G, IEEE 802.11 standard such as WiFi, IEEE 802.16 standard such as WiMAX, short-wave UHF radio wave standards such as Bluetooth™, or combinations thereof. Alternatively, or in addition, the communication element may establish communication through connectors or couplers that receive metal conductor wires or cables which are compatible with networking technologies such as ethernet. In certain embodiments, the communication element may also couple with optical fiber cables.

The control system 30 controls operational aspects of the irrigation system such as the speed and direction of the mobile towers, and hence the speed of the irrigation system, via control signals provided to the relays connected to the motors 22A-D of the mobile towers 16A-D. Likewise, the control system 30 controls the water flow through the water emitters 26A-P via control signals provided to the relays connected to the valves 28. The control system 30 may also control other operational aspects such as a fertilizer application rate, a pesticide application rate, end gun operation, mobile tower direction (forward or reverse), and/or system start-up and/or shut-down procedures.

The control system 30 may control some of the above-described operational aspects of the irrigation system in accordance with an irrigation plan (also sometimes referred to as a "sprinkler chart", "irrigation schedule" or "watering plan"). An irrigation plan specifies how much water to apply to a field, and sometimes to different portions of a field, based on various different criteria such as the types of crops to be irrigated; the soil conditions in various parts of the field; the existence of slopes, valleys, etc. in the field; the existence of roads, buildings, ponds, and boundaries that require no irrigations; crop growth cycles; etc. One or more irrigation plans may be created then stored in memory associated with the control system and/or may be transmitted to the control system from the remote server and/or one of the remote computing devices.

Figure 2:
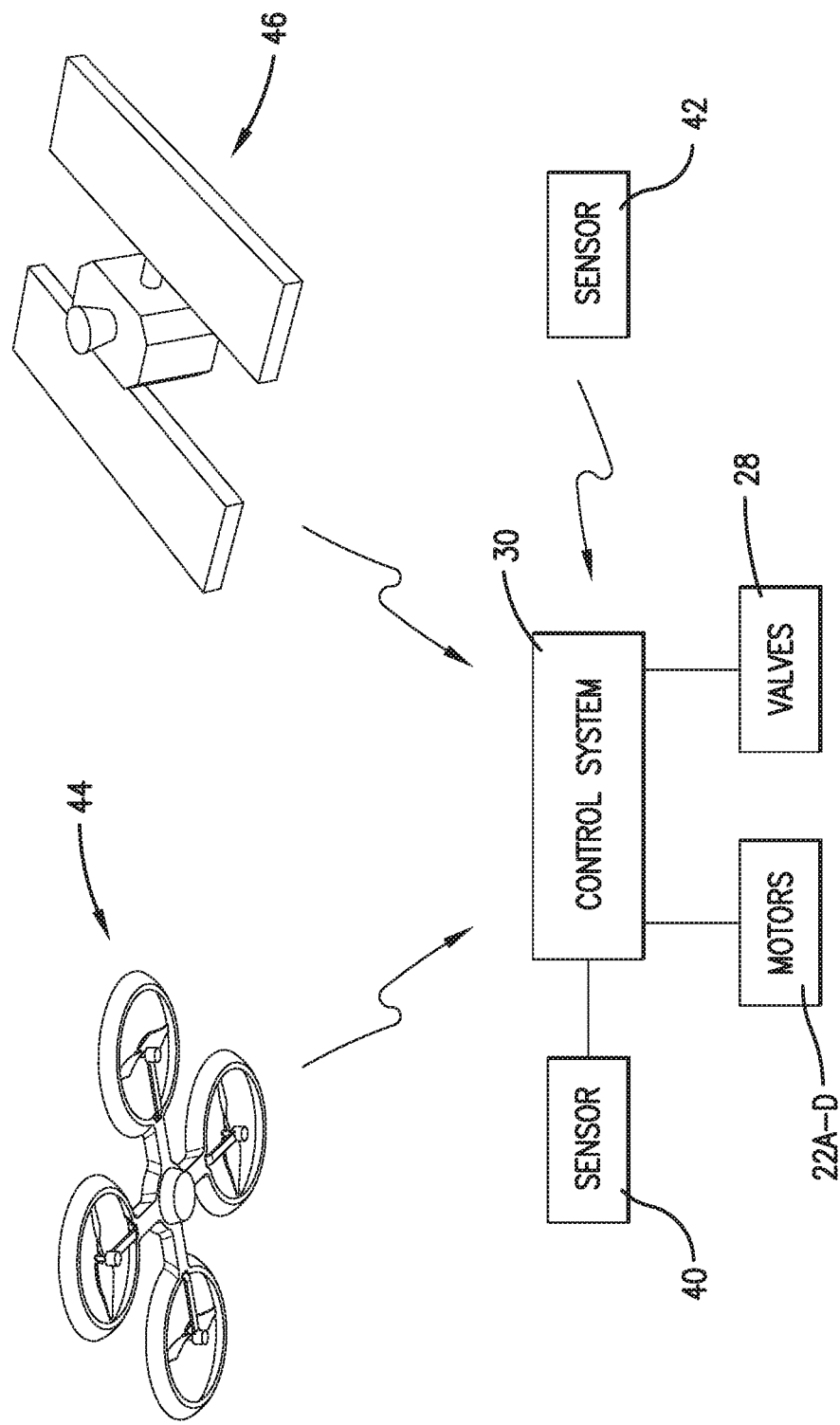
FIG. 2 is a block diagram depicting selected components of a control system of the irrigation system of FIG. 1.

As shown in FIG. 2, the control system 30 receives data from one or more sensors 40, 42 and one or more remote imaging systems 44, 46. Data from these sensors and remote imaging systems is analyzed by the control system and/or other computers in communication with the control system to detect significant crop events and improve irrigation scheduling in response to such detections.

The sensors 40,42 may be positioned on the mobile support towers or in the field and may sense or otherwise measure any factors related to the maturity and/or health of irrigated crops. For example, the sensors may measure the amount of water delivered to the crops, the amount of water in the ground, air temperatures near the crops, humidity near the crops, soil content, and/or other crop information. The sensors then generate corresponding crop growth data and communicate it to the control system and/or remote computing systems via wired or wireless connections.

The remote imaging systems 44, 46 may be any devices capable of gathering images of crops such as satellites, unmanned aerial vehicles (UAVs), or cameras mounted on poles or other structures. The remote imaging systems 44, 46 the generate associated aerial image data and transmit the data, directly or indirectly, to the control system, via wireless connections. These images may be generated periodically, such as once per day, or nearly continuously.

The data server 34 generally stores and processes electronic data and may include application servers, database servers, file servers, web servers, or the like, or combinations thereof. Furthermore, the data server 34 may include a plurality of servers (perhaps geographically separated), virtual servers, or combinations thereof. The data server 34 may store and provide to the control system 30 weather information such as current conditions, weather forecasts, rainfall measurements, rainfall forecasts, crop information such as coefficients for specific crops derived from dynamic crop growth models, as well as other meteorological and agricultural information. The data server 34 may be operated by government bodies, commercial enterprises, or the like, or combinations thereof. In some embodiments, the data server 34 may be integrated with, or housed with, the control system 30.

The control system 30 and the data server 34 may each comprise one or more memory elements and one or more processing elements. Each memory element may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a "computer-readable medium". The memory element may store the instructions, code, code segments, software, firmware, programs, applications, apps, services, daemons, or the like that are executed by the processing element. The memory element may also store settings, data, documents, sound files, photographs, movies, images, databases, and the like.

Each processing element may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. Each processing element may generally execute, process, or run instructions, code, code segments, software, firmware, programs, applications, apps, processes, services, daemons, or the like. The processing elements may also include hardware components such as finite-state machines, sequential and combinational logic, and other electronic circuits that can perform the functions necessary for the operation of the current invention. The processing element 36 may be in communication with the other electronic components through serial or parallel links that include universal busses, address busses, data busses, control lines, and the like.

Through hardware, software, firmware, or various combinations thereof, the processing elements may be programmed to, or configured to, perform the tasks and function described in this application. The processing elements may generate control signals that include one or more electronic signals and/or digital data which open and close the valves that control the flow of water through the conduit. The processing elements may also generate control signals that include one or more electronic signals and/or digital data which operate the motors 22, including whether the motors 22 are on or off, and the speed and direction of travel. The control signals may be transmitted directly or indirectly either through wired or wireless communication, such as Bluetooth™, etc.

Irrigation of crops, and hence control of the irrigation system 10, is based around "ground-truthing" crop growth and development within dynamic irrigation scheduling according to either outputted scheduling recommendations or automation. Crop growth and development plays a critical role in proper irrigation scheduling, as crop modeling allows for predicting and determining both observed and forecasted crop water usage, potential crop yield loss due to water stress, and critical soil water depletion levels.

By utilizing advanced aerial image processing to "ground-truth" and derive key vegetative cover indexes and indicators, such as Leaf Area Index (LAI), Enhanced Vegetative Index (EVI), and/or fraction of green vegetation cover (fCover), crop growth models can be precisely manipulated to improve the accuracy of observed and forecasted crop water usage, potential crop yield impact, and critical soil water depletion levels to calibrate the dynamic irrigation scheduling output and adjust the irrigation system recommendation and automation.

Figure 4:
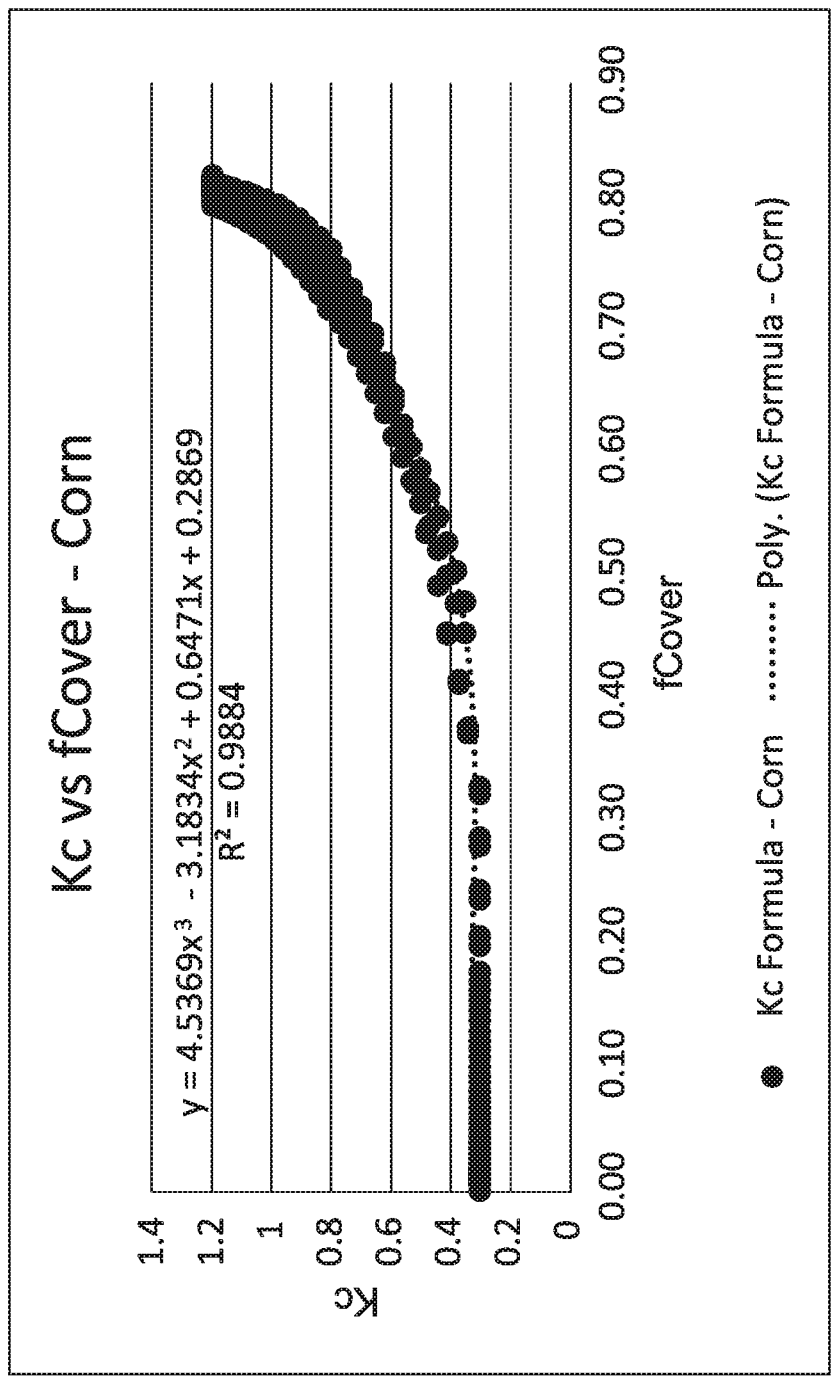
FIG. 4 is a graph of $K_c$ versus fCover for a corn crop.
Figure 5:
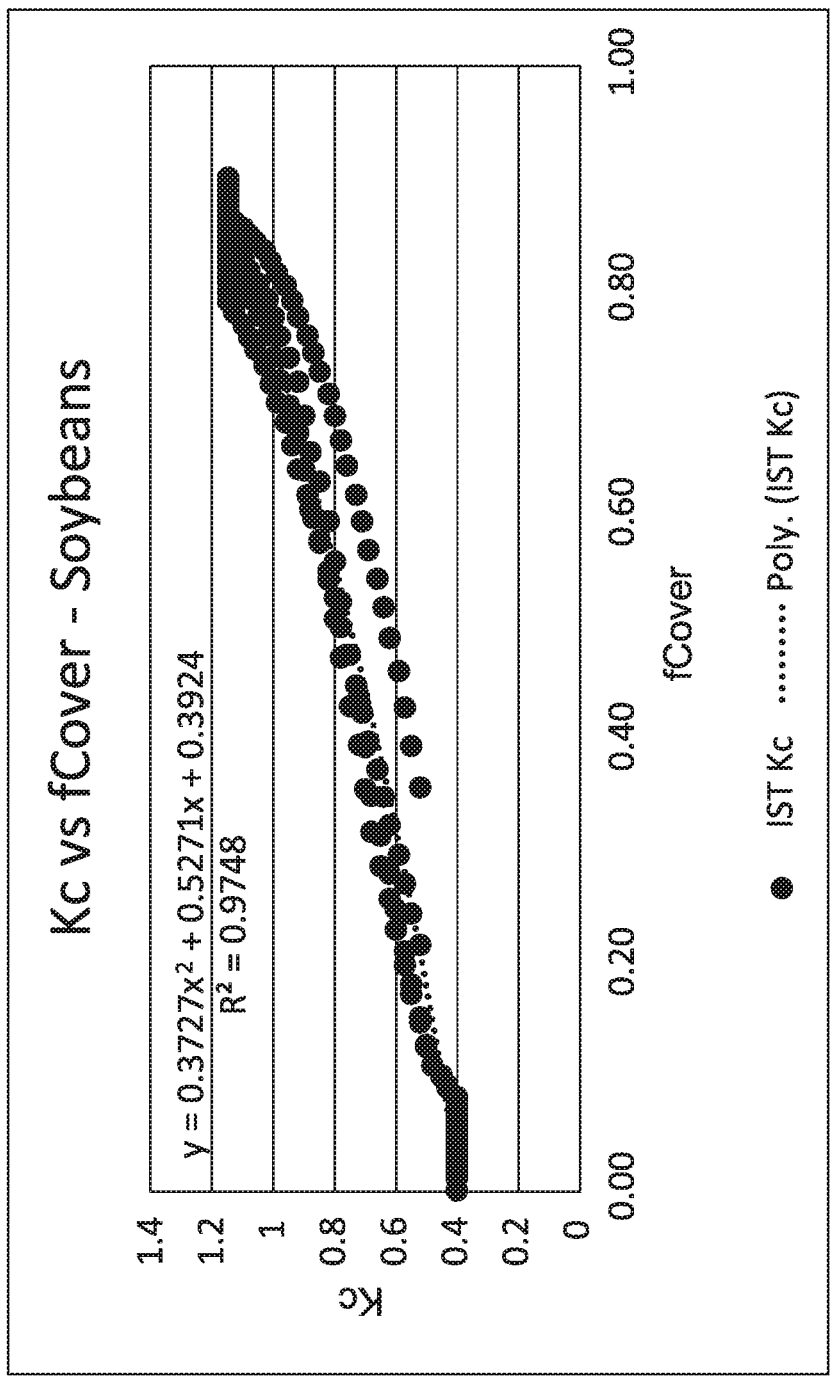
FIG. 5 is a graph of $K_c$ versus fCover for a soybean crop.

Adjusting crop growth and development based on advanced image processing revolves around correlating the processed image output (e.g., LAI, EVI, fCover) to derive a crop coefficient value (e.g., Kc) for the particular crop in a field. This crop coefficient value can then be used to back calculate and adjust the crops growth stage, rooting depth, yield response, and critical depletion factor based on the particular date the image was taken and (optionally) a key crop growth indicator, such as accumulated GDUs, growing days, and/or growth ratio (current growth divided by total growth). See FIG. 4 for an example of correlation of fCover to observed Kc for corn and soybeans. It will be understood that these parameters, coefficients, and variables are examples only and that other image processing tools, equations, and factors may be used.

As mentioned earlier, the processed aerial image output derived for a particular date when the image was taken can be utilized to auto-correct the historical, current, and forecasted growth stages, $K_c$ values, rooting depths, yield response, and critical depletion factors for a particular crop. These corrected values all play a major role in dynamic irrigation scheduling and deriving proper irrigation recommendations and automation.

Growth stages assist in deriving the below irrigation scheduling variables and forecasting crop growth to derive an expected maturity date (the date the crop is fully mature and no yield loss can occur) for a particular crop. $K_c$ determines water usage of a particular crop, which is used to determine soil water depletion in the soil water balance equation:

$$D_i = D_{i-1} + EP_{c,i} - EP_i - I_i - CR_i \quad (1)$$

wherein $D_{i-1}$ is soil water depletion for day i−1 (e.g., yesterday), $ET_{c,i}$ is crop evapotranspiration on day i (equal to $ET_{o,i}$ times $K_{c,i}$ (no stress)), $EP_i$ is effective precipitation on day i (equal to Actual Precipitation P minus runoff from soil surface Q), $I_i$ is net irrigation depth applied on day i (from real time, as applied irrigation data), and $CR_i$ is equal to capillary rise from groundwater table on day i=0 (for water table >1 meter below bottom of root zone). The soil water depletion for day i−1 is determined as follows:

$$D_{i-1} = \begin{cases} 0, & D_{i-1} < 0 \text{ (mm) (accounts for deep percolation occuring when less than 0)} \\ D_{i-1}, & D_{i-1} \geq 0 \text{ (mm)(no deep percolation has occurred)} \end{cases} \quad (2)$$

Note that if $ET_{c\ adj,\ i}$ is less than $ET_{c,i}$, then the crop has entered stress on day i and will experience yield loss.

Rooting Depth determines the Total Available Water (TAW) and Permanent Wilting Point (PWP) or depletion value at which the crop essentially dies for the particular crop and date:

$$TAW_i = AWHC \cdot RD_i \quad (3)$$

wherein TAW is total available water on day i (in millimeters), AWHC is total available water holding capacity of the soil (in millimeters per meter), and $RD_i$ is the root depth of the crop on day i (in meters).

Critical Depletion Factor determines the Readily Available Water (depletion value at which the crop becomes stressed and yield potential is impacted) for the particular crop and date:

$$RAW_i = TAW_i \times DF_i \quad (4)$$

wherein $RAW_i$ is readily available water on day i (in millimeters), $TAW_i$ is total available water on day i (in millimeters), and $DF_i$ is critical depletion factor of the crop on day i.

Yield Response determines the crop's potential yield loss due to water stress and utilizes all of the aforementioned variables ($K_c$, rooting depth, and critical depletion factor) to derive the outputted potential yield loss value.

The aerial imagery outputs may also be used to determine a significant crop event experienced by a particular crop. A significant crop event occurs when substantial damage or other inhibitors impact crop growth and performance more than typical weather variations. A significant crop event may be a pest infestation, a heat wave, a hail storm, a drought or dry spell, and/or a flood or high water. These significant crop events can be determined by the aerial imagery based on current and historic crop growth data combined with a "significant" indicator, such as percent reduction in vegetative index over a set time interval or a percent reduction in adjusted $K_c$ versus calculated $K_c$. These may trigger a reset of the crop growth model for the image date. This reset will then impact the forecasted dynamic irrigation schedule, irrigation recommendations, and subsequent system control/automation.

Depending on the resolution of the imagery, these outputs can be derived across an entire agricultural field or area, allowing significant crop events to be determined, corrections and calibrations to be made to the crop growth models and irrigation schedules, recommendations to be formulated, and system control to be implemented for each individual area of the field or fields.

The following examples are illustrations of the detection of significant crop events based on the processed image output for a particular crop at a specific point in the field and corresponding changes to an irrigation plan. It will be understood that the following are examples only and that other image processing tools, equations, and factors may be used.

Example 1—Correcting Irrigation Scheduling Variables

Figure 7:
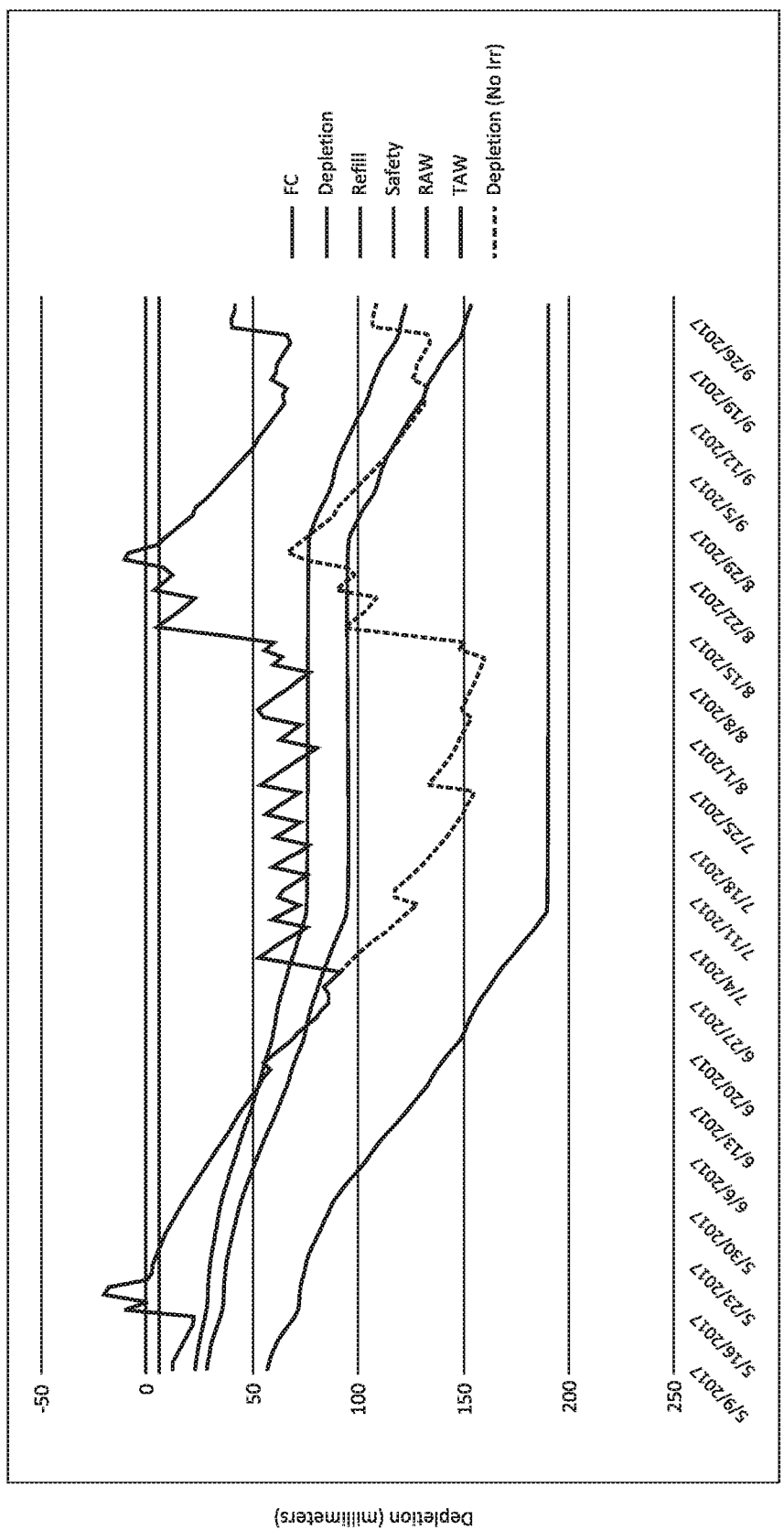
FIG. 7 is a graph of crop values for a selected period of time with no adjustments.

A corn crop was planted in a section of a field (GPS coordinates 41.86220, −96.39132) on May 9, 2017 with a relative maturity value of 112 days and a GDUs to maturity value of 2800. An aerial image was taken on Jul. 1, 2017 for the location and processed to derive an fCover value of 0.68 for the particular point of the field the crop was located. FIGS. 6 and 7 show the original (no adjustments) crop growth and soil water depletion data for Jul. 1, 2017 derived by the dynamic irrigation scheduling and crop growth model.

Figure 9:
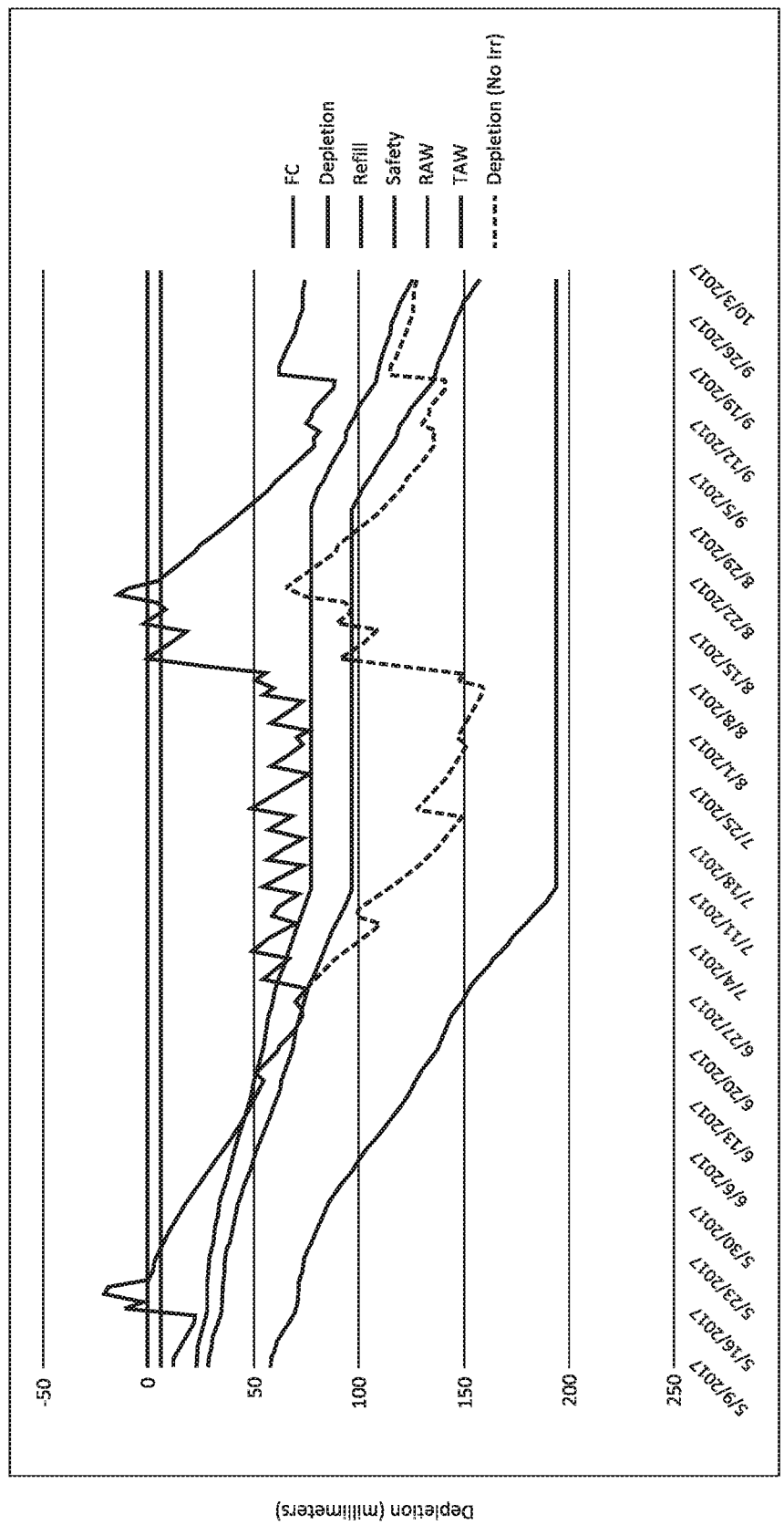
FIG. 9 is a graph of crop values for a selected period of time based on adjustments to a crop growth and irrigation schedule model.

According to the equation defined in the "Kc vs fCover+ Corn" chart detailed earlier, an fCover value of 0.68 for corn corresponds to a $K_c$ value 0.6815. Based on this $K_c$ value, the crop growth and irrigation schedule model can be adjusted historically and currently to derive the following crop growth and soil water depletion data for Jul. 1, 2017, as shown in FIGS. 8 and 9.

After these corrections are made currently and historically, the dynamic irrigation schedule and crop growth model can adjust the forecasted values to reflect these corrections and provide more accurate irrigation recommendations and/or system control/automation. In this example, an irrigation schedule may be changed to better reflect the crop's water usage, both to-date and forecasted. The water usage by the crop, to-date, would be less than originally estimated/measured since growth was slowed and, by having a better understanding of the to-date water usage of the crop, allows for more accurate forecasted water usage estimates, resulting in a more precise, dynamic irrigation schedule.

Example 2—Determining Significant Event

Figure 11:
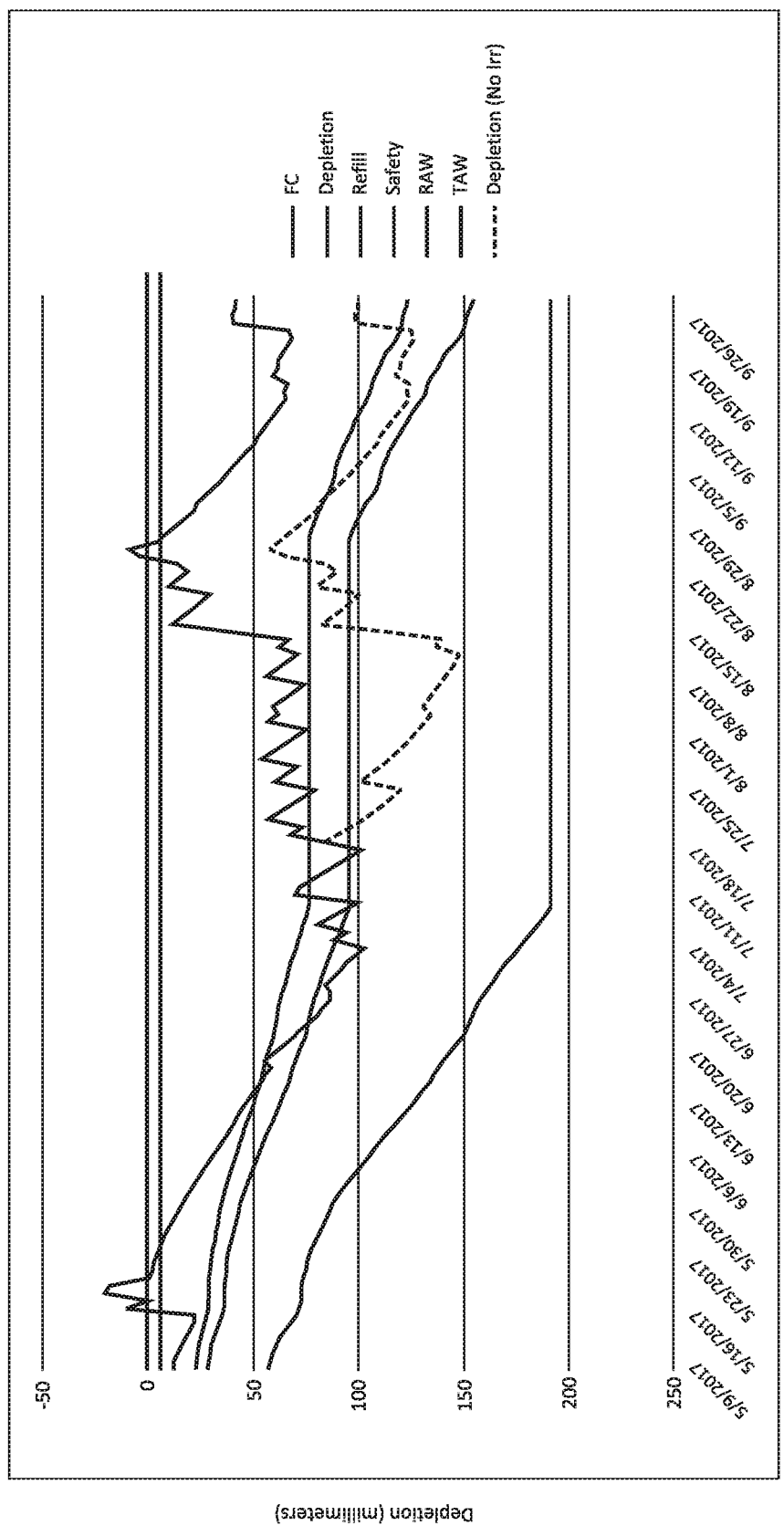
FIG. 11 is a graph of crop values for a selected period of time with no adjustments.

Using the same crop data as Example 1, assume an fCover value of 0.73 was captured on Jul. 18, 2017, which correlates to a $K_c$ value of 0.82. FIGS. 10 and 11 show the original (no adjustments) crop growth and soil water depletion data for Jul. 18, 2017 derived by the dynamic irrigation scheduling and crop growth model.

Figure 13:
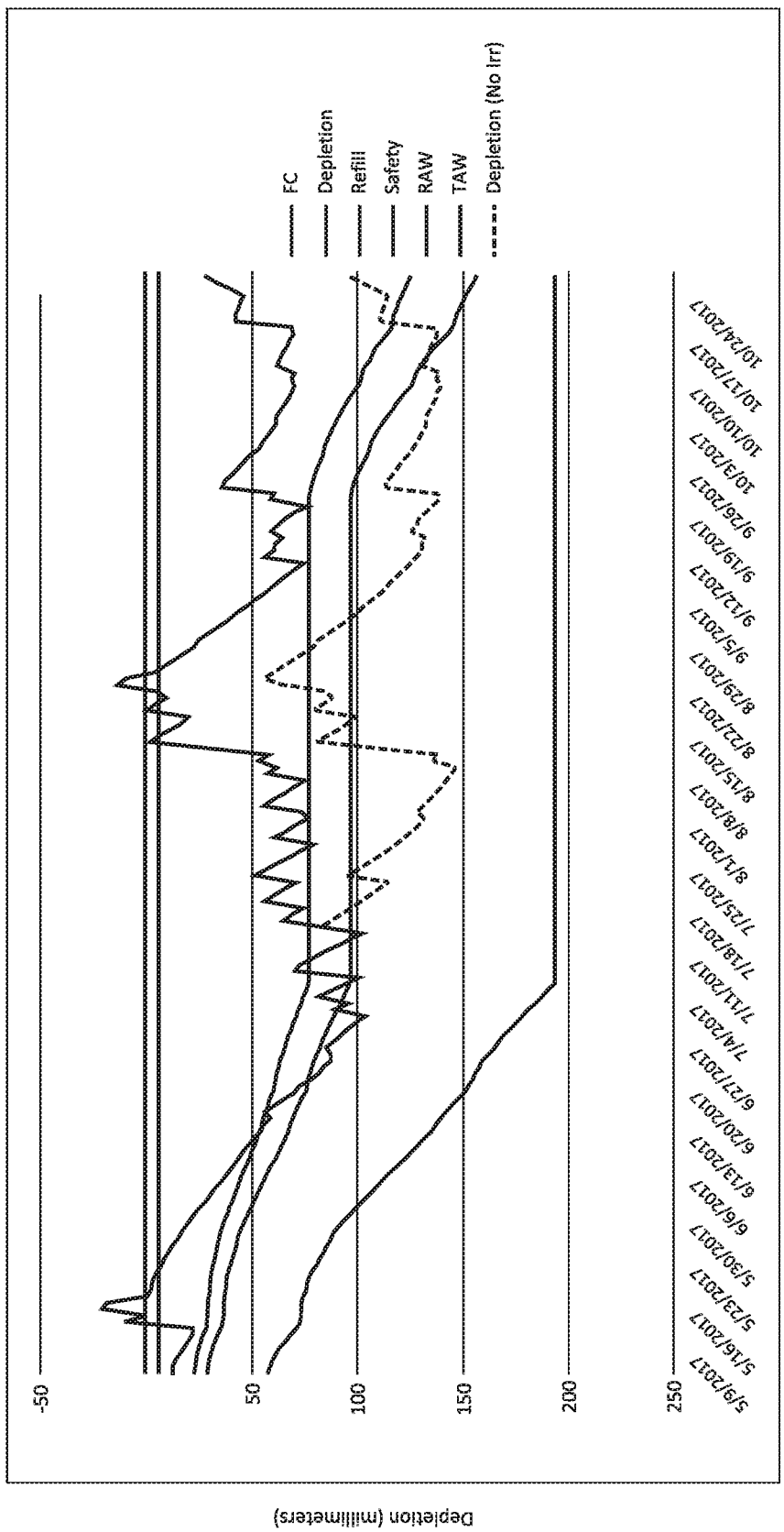
FIG. 13 is a graph of crop values for a selected period of time based on a reset crop growth and irrigation schedule model.

The corrected $K_c$ value, derived from the fCover value on Jul. 18, 2017, of 0.82 is a 32 percent reduction of the original, calculated $K_c$ value (1.20). Now, assuming any reduction greater than 32 percent (arbitrary number, not proven or tested) constitutes a significant crop event, the dynamic crop growth and irrigation schedule model can adjust the current and forecasted values to reflect this extremity and derive the following crop growth and soil water depletion data for Jul. 1, 2017, as shown in FIGS. 12 and 13.

In this particular example, a severe hail event occurred on Jul. 18, 2017, causing the crop to lose 5-7 leaves, which resulted in the lower fCover and $K_c$ value and adjusted the crop growth stage from V18 (vegetative stage with 18 primary leaves) to V11 (vegetative stage with 11 primary leaves). In this example, an irrigation schedule may be changed to better reflect the catastrophic event that has occurred. The catastrophic event does not impact the crop's water usage to-date, since the growth was not slowed in the past, but, rather, the crop was damaged, which impacts the water usage of the crop starting the day the catastrophic even occurred and onward. This will result in a more precise, dynamic irrigation schedule as a result of knowing that a catastrophic event occurred and adjusting the estimated/measured water usage of the crop accordingly.

The present invention also includes methods of controlling irrigation systems with the above-described technologies. One embodiment of the methods is shown in FIG. 14 and comprises irrigating a crop with an irrigation system according to an irrigation schedule (Step 100); receiving crop growth data from sensors that sense growth and/or health characteristics of the crop (Step 102); receiving aerial image data from an aerial image source (Step 104); determining whether a significant crop event has occurred based on the crop growth data and the aerial image data (Step 106); and adjusting the irrigation schedule if a significant crop event has occurred (Step 108). The computational aspects of the method may be performed by the control system, the data server, both, or another computing device in communication with the control system and/or the data server.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. For example, the principles of the present invention are not limited to the illustrated center pivot irrigation systems but may be implemented in any type of irrigation system including linear move irrigation systems.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some of the functions described herein may be implemented with one or more computer programs executed by one of the electronic devices described above. Each computer program comprises an ordered listing of executable instructions for implementing logical functions and can be embodied in any computer-readable medium for use by or in connection with an instruction execution system, apparatus, or device that can fetch the instructions and execute the instructions. In the context of this application, a "computer-readable medium" can be any means that can contain, store, communicate, propagate or transport the program for use by or in connection with the instruction execution system, apparatus, or device including, but not limited to, the memory of the electronic devices described above. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, processing elements may be implemented as special purpose computers or as general purpose computers. For example, the electronic devices described above may comprise dedicated circuitry or logic that is permanently configured, such as an application-specific integrated circuit (ASIC), or indefinitely configured, such as an FPGA, to perform certain operations. The electronic devices may also comprise programmable logic or circuitry (e.g., as encompassed within a general-purpose processor or other programmable processor) that is temporarily configured by software to perform certain operations. It will be appreciated that the decision to implement the electronic devices as special purpose, in dedicated and permanently configured circuitry, or as general purpose (e.g., configured by software) may be driven by cost and time considerations.

Accordingly, the terms "electronic devices", "electronic circuits," "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the electronic circuits are temporarily configured (e.g., programmed), each of the processing elements need not be configured or instantiated at any one instance in time. For example, where the electronic circuits comprise a general-purpose processor configured using software, the general-purpose processor may be configured as respective different processing elements at different times. Software may accordingly configure the electronic circuits to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described and claimed herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of the methods may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

1. An irrigation system for irrigating a crop, the irrigation system comprising:
    a plurality of mobile support towers configured to move across a field, each mobile support tower having a motor;
    a fluid-carrying conduit supported above the field by the mobile towers;
    water emitters coupled with the fluid-carrying conduit;
    at least one valve for controlling flow of fluids through the water emitters; and
    a control system programmed and configured to:
        control operation of at least one of the motors and the valve in accordance with an irrigation schedule to deliver a prescribed amount of water to the crop,
        receive crop growth data representative of at least one of growth and health characteristics of the crop,
        construct a crop growth model based on the crop growth data, the crop growth model being divided into a plurality of growth stages over time,
        receive aerial image data of the crop,
        create augmented crop growth data by adjusting the crop growth data in accordance with the aerial image data,
        adjust the crop growth model according to the augmented crop growth data,
        determine whether a significant crop event has occurred at a current time based on the augmented crop growth data,
        if a significant crop event has occurred at the current time, revert the crop growth model according to the augmented crop growth data to a previous one of the plurality of growth stages at the current time, the significant crop event being selected from the group consisting of a pest infestation, a heat wave, a hail storm, a drought, a dry spell, a flood, and high water, and
        change the irrigation schedule according to the reverted crop growth model.

2. The irrigation system as set forth in claim 1, wherein the control system is positioned locally near one of the mobile towers.

3. The irrigation system as set forth in claim 1, wherein the control system is positioned remotely from the mobile towers.

4. The irrigation system as set forth in claim 1, wherein the crop growth data is received from sensors and corresponds to at least one of an amount of water delivered to the crop; an amount of water in ground in which the crop is planted; air temperature near the crop; humidity near the crop; and soil content of the ground.

5. The irrigation system as set forth in claim 1, wherein the aerial image data is received from a satellite or an unmanned aerial vehicle.

6. A method of controlling an irrigation system, the method comprising:
- irrigating a crop with the irrigation system according to an irrigation schedule;
- receiving crop growth data representative of at least one of growth and health characteristics of the crop;
- constructing a crop growth model based on the crop growth data, the crop growth model being divided into a plurality of growth stages over time;
- receiving aerial image data of the crop;
- creating augmented crop growth data by adjusting the crop growth data in accordance with the aerial image data;
- adjusting the crop growth model according to the augmented crop growth data;
- determining whether a significant crop event has occurred at a current time based on the augmented crop growth data;
- if a significant crop event has occurred at the current time, reverting the crop growth model according to the augmented crop growth data to a previous one of the plurality of growth stages at the current time, the significant crop event being selected from the group consisting of a pest infestation, a heat wave, a hail storm, a drought, a dry spell, a flood, and high water; and
- changing the irrigation schedule according to the reverted crop growth model.

7. The method as set forth in claim 6, wherein the crop growth data is received from sensors and corresponds to at least one of an amount of water delivered to the crop; an amount of water in ground in which the crop is planted, air temperature near the crop; humidity near the crop; and soil content of the ground.

8. The method as set forth in claim 6, wherein the aerial image data is received from a satellite or an unmanned aerial vehicle.

9. A control system for an irrigation system having motors and one or more valves, the control system programmed and configured to:
- control operation of at least one of the motors and the valve in accordance with an irrigation schedule to deliver a prescribed amount of water to a crop;
- receive crop growth data representative of at least one of growth and health characteristics of the crop;
- construct a crop growth model based on the crop growth data, the crop growth model being divided into a plurality of growth stages over time and including rooting depth, yield response, and critical depletion factor;
- receive aerial image data of the crop;
- create augmented crop growth data by adjusting the crop growth data in accordance with the aerial image data, the augmented crop growth data including Leaf Area Index (LAI), Enhanced Vegetative Index (EVI), and fraction of green vegetation cover (fCover);
- determine a crop coefficient value for the crop growth model based on the augmented crop growth data;
- adjust the rooting depth, yield response, and critical depletion factor of the crop growth model according to the crop coefficient value;
- determine whether a significant crop event has occurred at a current time based on the crop coefficient value;
- if a significant crop event has occurred at the current time, revert the crop growth model according to the crop coefficient value to a previous one of the plurality of growth stages at the current time, the significant crop event being selected from the group consisting of a pest infestation, a heat wave, a hail storm, a drought, a dry spell, a flood, and high water; and
- change the irrigation schedule according to the reverted crop growth model.

10. The control system as set forth in claim 9, wherein the control system is positioned locally near the irrigation system.

11. The control system as set forth in claim 9, wherein the control system is positioned remotely from the irrigation system.

12. The control system as set forth in claim 9, wherein the crop growth data is received from sensors and corresponds to at least one of an amount of water delivered to the crop; an amount of water in ground in which the crop is planted; air temperature near the crop; humidity near the crop; and soil content of the ground.

* * * * *